United States Patent [19]

Cavagnolo

[11] Patent Number: 4,744,020
[45] Date of Patent: May 10, 1988

[54] SWITCHING MODE POWER SUPPLY

[75] Inventor: Gian P. Cavagnolo, Milan, Italy

[73] Assignee: Honeywell Information Systems Italia, Caluso, Italy

[21] Appl. No.: 46,769

[22] Filed: May 7, 1987

[30] Foreign Application Priority Data

May 22, 1986 [IT] Italy .................. 20527 A/86

[51] Int. Cl.⁴ .......................................... H02M 3/335
[52] U.S. Cl. ........................................ 363/21; 363/56;
363/97; 323/289
[58] Field of Search ............... 363/20, 21, 56, 97,
363/131; 323/289

[56] References Cited

U.S. PATENT DOCUMENTS 3,983,418  9/1976  Wallace ................ 323/289 X
4,092,711  5/1978  Gerding et al. ........... 363/53
4,128,867 12/1978  Heyman ................. 363/21
4,277,824  7/1981  Alberkrack ............ 363/20 X
4,629,971 12/1986  Kirk .................... 323/289

FOREIGN PATENT DOCUMENTS 0001217 1/1983 Japan ........................... 363/21

Primary Examiner—Patrick R. Salce
Assistant Examiner—Kristine Peckman
Attorney, Agent, or Firm—John S. Solakian

[57] ABSTRACT

A switching mode power supply where an input rectified voltage feeds in chopped mode the primary winding of a power transformer under the control of a transistor turned on by voltage pulses periodically generated by an oscillator directly fed by the input voltage and applied to the transistor through a control transformer, said transistor being turned off by a voltage pulse generated by regulating circuits fed by the output voltage of the power supply and applied to the transistor through the same control transformer which is further provided with a winding where an electromotive force is induced which is proportional to the current flowing through the primary winding of the power transformer.

3 Claims, 2 Drawing Sheets

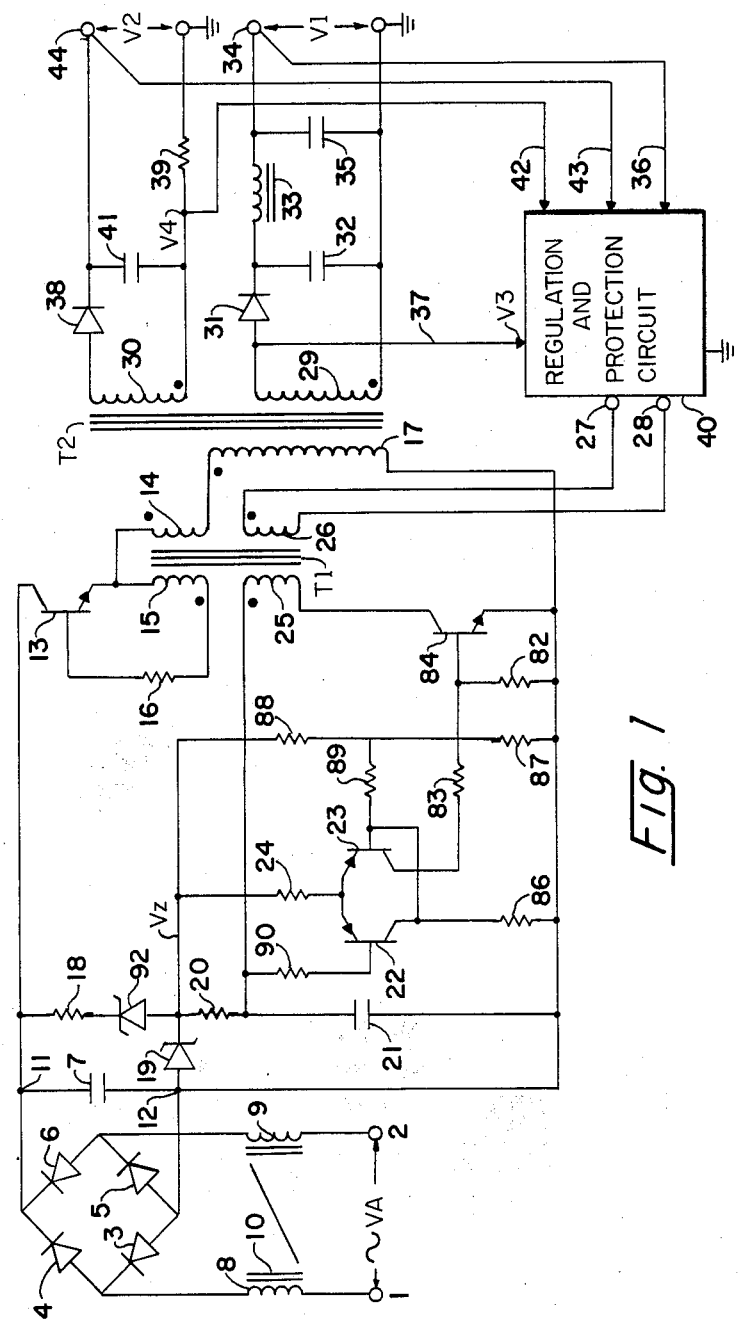
Fig. 1
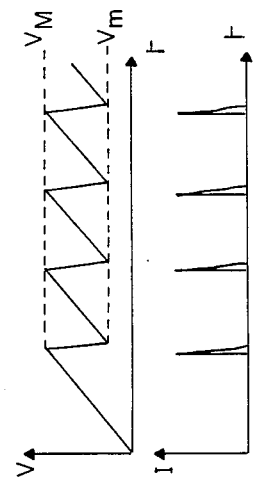
Fig. 2
Fig. 3

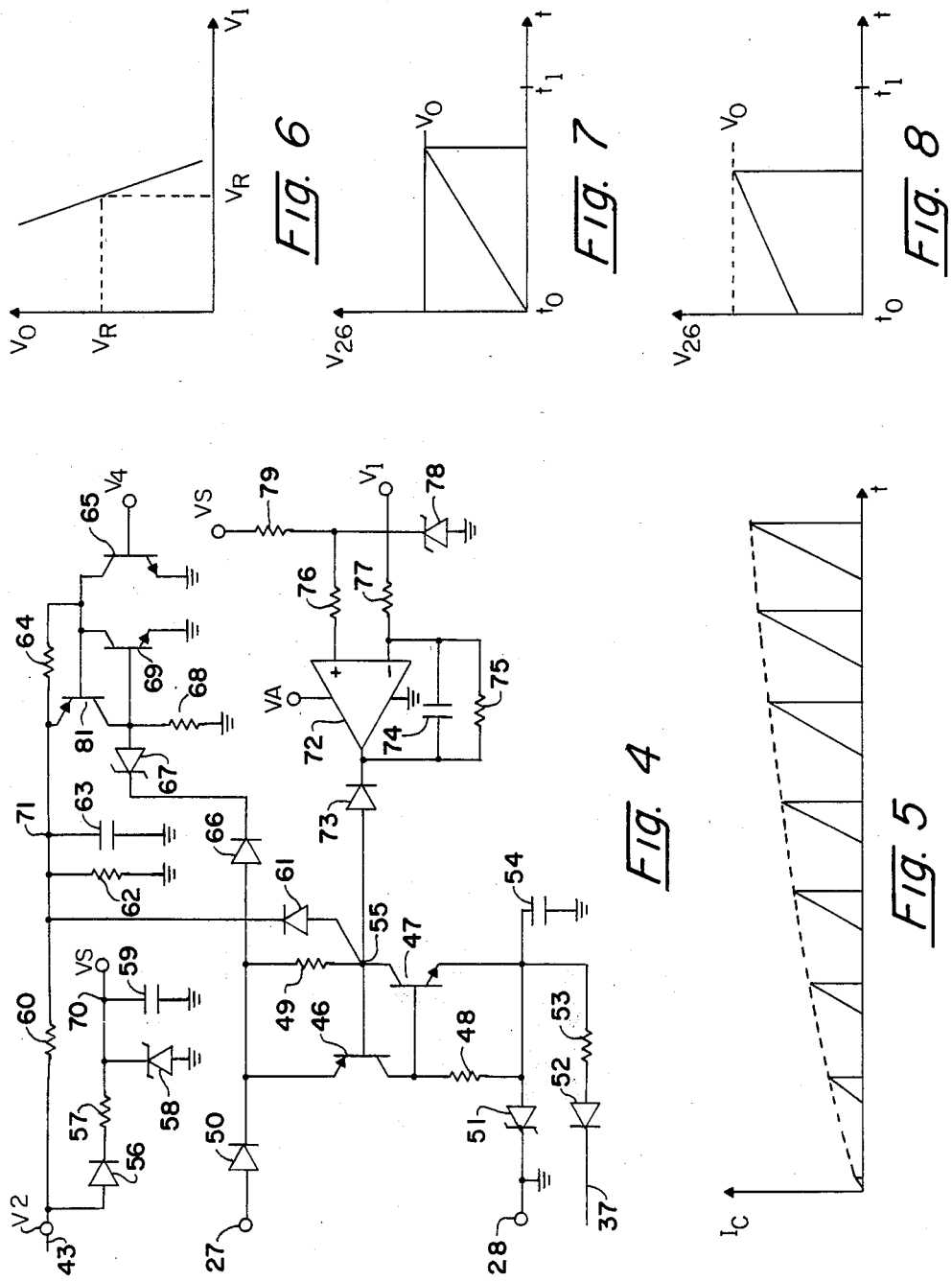

SWITCHING MODE POWER SUPPLY

BACKGROUND OF THE INVENTION

The present invention relates to a switching mode power supply. It is known that switching mode power supplies of all types are widely used to supply power to electronic equipment requiring stabilized voltages.

The switching mode power supplies receive an input an AC main voltage and through rectifying circuits, filters and switching devices, transformers, output rectifying bridges and filters, generate an output of one or more DC supply voltages, stabilized with great precision.

However, the generation of a regulated direct voltage is not the sole function carried out by the power supplies. They must also provide for some forms of protection in order to interrupt operation in case of short circuits, overloads and overcurrent.

It is also required that they be started gradually (soft-start) and that, in general, the electrical isolation from the mains and the output supply circuits be guaranteed.

Because of the complexity of the power supply requirements many and differing embodiments have been proposed. In order to ensure the electrical isolation between the mains and the output circuits a transformer is used, however this does not suffice.

Current flowing through the transformer primary winding is under the control of switching devices, generally one or more transistors, which must receive driving signals from the regulating circuits. These, in turn, in order to carry out the regulation function, must receive signals coming from different locations.

Clearly if the regulation function is to control the output voltage it must receive a feedback signal from the output circuits.

At the same time, however, since it must protect the power supply from overloads, it should receive a signal proportional to the current drained by the primary voltage, since it is not very convenient to monitor the overloads as the sum of the various loads on the different output circuits.

Finally, for the regulating circuits to carry out their function, they must be provided with a supplied voltage.

Two basic approaches have been derived from these contrasting requirements and they have been adopted up to now for the design and production of power supplies.

One of these approaches is to connect and supply the regulating circuits with power directly obtained from the mains by means of auxiliary power supplies. The output voltage signal present at the output circuits of the main power supply is transmitted to the regulating circuits through relatively expensive decoupling devices such as optoelectronic couplers or current switching devices combined with transformers.

In the second approach, although the regulating circuits are connected to the output circuits they are supplied with power from the mains by auxiliary power supplies which require the use of a transformer for the electrical isolation. The control signals which drive the current switching devices at the primary side are supplied by transformers which guarantee the electrical isolation. Also, the primary current feedback signal used by the regulating circuits to prevent overloads is transferred to the regulating circuits through a current transformer. This results in a wide use of transformers which make the embodiment relatively expensive and cumbersome.

U.S. Pat. Nos. 4,128,867 and 4,092,711 are exemplary of this second approach, whereas, an example of the first approach is shown in the publication "Application Note" U-90, page 948, published by UNITRODE CORPORATION, with reference to the use of a control integrated circuit available under code UC1524A.

Integrated circuits are now available which carry out the various regulation and control functions as referred to, with the sole addition of few external circuit elements.

As explained above, they can be used with both the mentioned approaches, with all the related constraints and drawbacks which have been indicated.

SUMMARY OF THE INVENTION

The above drawbacks are overcome by the switching mode power supply, which is the object of the present invention, which makes use of a driving circuit for periodically switching on the switching devices at constant frequency.

This driving circuit is connected to and fed directly by the mains, whereas the regulating circuit is directly fed by the output circuits which are regulated by the above-mentioned regulating circuits. This regulating circuit is isolated from the mains and performs the regulation function through turn-off commands applied to the switching device by means of a driving transformer.

According to another aspect of this invention, the driving transformer further performs the function of current transformer for monitoring the primary current, which results in notable simplification of construction and in an ensuing reduction in cost. It also holds the turn-on command through a regenerative sustaining function.

According to another aspect of this invention, a function similar to the "switching off" of the power supply, which has been carried out up to now by auxiliary switching devices additional to those that perform the regulation, is directly carried out by the regulation switches themselves with resulting further simplification in construction.

These and other features of this invention will appear more clearly from the following description of a preferred embodiment(s) of the invention and from the related drawings.

BRIEF DESCRIPTION OF THE DRAWINGS

FIG. 1 shows the electrical diagram of a preferred form of embodiment of a switching mode power supply, according to the present invention.

FIG. 2 shows the timing diagram of the charging voltage of a capacitor in FIG. 1.

FIG. 3 shows the timing diagram of the current flowing through a winding in FIG. 1.

FIG. 4 shows the wiring diagram of a preferred form of embodiment of the regulating circuit for the power supply shown in FIG. 1.

FIG. 5 shows the timing diagram of the current flowing through the power primary winding of the power supply shown in FIG. 1 at start-up.

FIG. 6 shows the response curve of a comparator in the diagram shown in FIG. 4.

FIGS. 7 and 8 show the timing diagram of the electromotive force induced in a winding of the diagram shown in FIG. 1, operating either in fly-back mode or feed-forward mode.

DESCRIPTION OF THE PREFERRED EMBODIMENT(S)

FIG. 1 shows the global wiring diagram of the switching mode power supply that is the object of the present invention.

FIG. 1 shows that an input A.C. supply voltage $V_A$, (e.g. 220 V), is applied to the power supply input terminals 1 and 2, rectified through the bridge rectifiers 3, 4, 5 and 6 and used to charge a capacitor 7, so as to obtain at its terminals 11, 12 a relatively constant and rectified voltage.

The input inductance which consists of two windings 8, 9 and magnetic core 10 limits the propagation of the electrical noise generated by the power supply in the input circuit.

Terminal 11 is connected to the collector of a power transistor 13 whose emitter is connected to one of the terminals of a first and second winding 14, 15 of a driving transformer T1 having 4 windings. The other terminal of winding 15 is connected to the base of transistor 13 through a resistor 16. The other terminal of winding 14 is connected to one of the terminals of a primary winding 17 of a power transformer T2. The other terminal of winding 17 is connected to terminal 12 of the input capacitor 7.

A resistor 18, a zener diode 92 and a zener diode 19 are connected in series between terminal 11 and terminal 12. The DC voltage present at the terminals feeds resistor 18, zener diode 92 and zener diode 19 at whose leads a stabilized voltage $V_z$ is available. Zener diode 92 establishes the minimum charging voltage of capacitor 7 required to trigger the operation of the oscillator circuit which will be described later.

The regulated voltage feeds an RC circuit that comprises resistor 20 and capacitor 21 connected in series, as well as a differential circuit. The differential circuit consists of two PNP type transistors 22 and 23 whose emitters are connected to one another and also to the cathode of zener diode 19 through resistor 24. The base of transistor 22 is connected to the intermediate node 91 of the RC circuit through resistor 90. The base of transistor 23 is connected, through resistor 89, to the intermediate node of a voltage divider that consists of resistors 88, 87 and that is fed by the stabilized voltage $V_Z$. The collector of transistor 22 is connected to the anode of zener diode 19 through resistor 86. Node 91 is connected to one of the terminals of a third winding 25 of transformer T1.

The other terminal is connected to the collector of an NPN type transistor 84.

The emitter of transistor 84 is connected to the anode of zener diode 19. The base of transistor 84 and the collector of transistor 23 are connected to one another through resistor 83.

In addition, the base and the emitter of transistor 84 are connected to one another through resistor 82.

The collector of transistor 22 and the base of transistor 23 are directly connected to one another.

Transformer T1 is provided with a fourth winding 26 whose terminals 27 and 28 are connected to a regulation and protection circuit which is represented by block 40.

The already mentioned power transformer T2 is provided with two output secondary windings 29 and 30 respectively.

One of the terminals of the winding 29 is connected to ground. The other terminal of winding 29 is connected to the anode of a diode 31 whose cathode is connected to an LC filter that comprises a capacitor 32 connected between diode 31 cathode and ground, an inductor 33, connected between the cathode and an output terminal 34, and a capacitor 35 which is connected between terminal 34 and ground.

Terminal 34 is connected to an input of circuit 40 through lead 36. Also the anode of diode 31 is connected to an input of circuit 40 through lead 37.

A first terminal of winding 30 is connected to ground through a low value resistor 39.

The other terminal of winding 30 is connected to the anode of a diode 38 whose cathode is connected to an output terminal 44. A buffer capacitor 41 is connected between the first terminal of winding 30 and the cathode of diode 38.

The first terminal of winding 30 is also connected to an input of circuit 40 through lead 42.

Also the output terminal 44 is connected to an input of circuit 40 through lead 43.

The power supply shown in FIG. 1 is a switching mode, or more precisely, a current-mode power supply of the fly-back and current control type.

Before describing in detail the regulation and protection circuit 40 a brief description of how the power supply operates is given.

When an AC voltage VA is applied to the input terminals, a direct voltage VDC is generated at the terminals of capacitor 7 and applied between the collector and emitter of transistor 13 which is normally open because a zero voltage is present between the base and the emitter.

Due to the effect of voltage VDC applied to series circuit that comprises resistor 18 and zener diode 19, the cathode of zener diode 19 rises to a reference constant voltage $V_z$, with respect to its anode.

This voltage is used to charge capacitor 21 through resistor 20. Moreover it suitably feeds the differential circuit which comprises transistors 22 and 23.

Initially, with capacitor 21 discharged, the base of transistor 23 is at a voltage level higher than that of the base of transistor 22.

This voltage level is determined by the double voltage divider which consists of resistors 88 and 87 and resistors 89 and 86. Therefore transistor 22 is initially on while the transistor 23 is off.

As a result, transistor 84, whose base is connected to ground through resistor 87, is off.

When the voltage present at the terminals of capacitor 21 reaches an upper threshold value VM which is equal to the base voltage of transistor 23, transistor 23 starts to go on whereas transistor 22 starts to go off.

As a result the voltage present at the collector of transistor 22 decreases thus causing a positive feed-back to occur on the voltage present at the base of transistor 23 which decreases to a lower threshold value $V_m$ while transistor 23 turns rapidly on.

When transistor 23 is on, the base of transistor 84 is positively biased and also transistor 84 turns on.

Then capacitor 21 discharges itself through winding 25 and transistor 84, which is on, by applying a short voltage/current pulse to winding 25.

The voltage pulse applied to winding 25 induces in winding 15 a corresponding voltage pulse which forward biases the base emitter junction of transistor 13 causing it to turn on.

Therefore a current starts flowing from the collector to the emitter of transistor 13 and from the latter through winding 14 and winding 17.

Windings 15 and 14 are designed as to polarity and turn ratio so as to produce a regenerative effect or a positive feed-back.

In other words, the increase in current through winding 14 induces a voltage E across winding 15 thus causing an increasing current to flow through winding 15, resistor 16 and the base emitter junction of transistor 13.

Due to the effect of this current transistor 13 remains on even if in the meanwhile capacitor 21 has discharged itself (at such a value that the voltage applied to the base of transistor 22 equals the lower threshold voltage $V_m$ present at the base of transistor 23), thus causing the differential circuit made up of transistors 22 and 23 to be toggled and the transistor 84 to be turned off.

The transistor 13 driving circuit is a well known proportional base driving circuit that, however, has been modified by adding resistor 16.

It is possible to demonstrate that with the addition of resistor 16 to the proportional base driving circuit the following relationships holds true, with a good approximation:

$$I_C = K1 \cdot V15 + K2$$

where $I_C$ is the current at the collector of transistor 13, K1 is a proportional coefficient dependent on the resistor 16 value, V15 is the induced voltage across winding 15 and K2 is essentially a constant term dependent on VBE of transistor 13.

As a result, if winding 25 is either open or closed on a large impedance load the following relationship is also valid:

$$I_C = K3 \cdot V26 + K4.$$

That is, current is proportional to voltage present at the terminals of winding 26 regardless of a constant value.

When this voltage (and therefore current $I_C$) reaches the predefined value imposed by regulator 40, winding 26 is short-circuited by regulator 40 on a voltage opposed to the E.M.F. present at winding 26 and all the electromotive forces induced in the driving transformer T1 reverse thus causing transistor 13 to turn off and the collector $I_C$ current to be interrupted.

The collector current $I_C$ flows in winding 14 and also in winding 17 of transformer T2 which first is magnetized and then demagnetized as the current is interrupted.

Electromotive forces, first in one polarity and then in the opposite polarity, are subsequently induced through the secondary windings 29 and 30 and feed loads that might be connected to the output terminals 34 and 44 in addition to filter capacitors 32, 35, 41. The power supply shown in FIG. 1 is of the fly-back type; that is, the energy stored in transformer T2 is transmitted to the secondary windings during the demagnetizing phase.

It is however clear that the mere polarity reversal of the secondary windings of transformer T2 permits a feed-forward mode operation where the energy is transmitted to the secondary windings during the magnetizing phase of transformer T2.

It should be held in mind that in such a case it is advisable to utilize an output filter having an inductive input.

The regulation and protection circuit 40 receives in input the voltage V2 present at one output terminal 44 through lead 43, the voltage V4 present at one terminal of resistor 39, through lead 42, the voltage V1 present at output terminal 34 through a lead 36, the voltage V3 present at one of the terminals of winding 29 through lead 37, and the voltage V26 induced at the terminals of winding 26 through the terminals 27 and 28.

As it will be explained later, voltages V2 and V3 are also used as service voltages to power circuit 40 and voltage V4 supplies a voltage signal that is proportional to the current supplied by the auxiliary voltage generator which is fed by the second winding 30 to activate short-circuit protection circuitry.

Voltage V1 gives a measured voltage signal to be regulated for the activation of the regulating circuits.

Voltage V26 supplies a signal that is proportional to current $I_C$ that is controlled to regulate voltage V1.

FIGS. 2-3 show the timing diagram of the load voltage of capacitor 21 and the discharge current of the same capacitor respectively, through a winding 25 and a transistor 84.

The charge voltage increases with a substantially linear ramp (that is, the initial part of an exponential curve having an asymptotic value V2) until value $V_M$ is reached.

At this point, due to the effect of the differential circuit switching and to the turn on of transistor 84, a short pulse of discharging current quickly drops the charge voltage of capacitor 21 to level Vm.

It should be noted that Vm can be chosen within a wide range so as to be higher than the voltage drops in 84 and winding 25 as well as the value of electromotive force induced in winding 25 when the current starts flowing through winding 14.

Hence these voltage drops and the induced E.M.F. do not affect the lower threshold level Vm but simply the intensity and duration of the discharge pulse to a small degree. Therefore the pulse frequency is essentially defined with a high level of precision by the time constant of the RC circuit (resistor 20 and capacitor 21) by threshold values VM and Vm and by voltage Vz.

Therefore the RC network, the differential circuit and transistor 84 operate as a command pulse generator with a predefined and constant period.

These pulses turn on transistor 13 which is turned off again during each period according to the regulation and control operations carried out by circuit 40.

FIG. 4 shows a preferred form of embodiment of the regulation and control circuit 40.

For a better understanding circuit 40 can be considered as being formed by 3 blocks.

The first block acts as a control switch and comprises transistors 46, 47, resistors 48, 49, 53, diodes 50, 52, zener diodes 51 and capacitor 54.

The anode of diode 50 is connected to terminal 27 while the cathode is connected to the emitter of the PNP type transistor 46. The emitter and the base of transistor 46 are connected to one another, through resistor 49.

The collector of transistor 46 is connected to the base of the NPN type transistor 47. It is also connected to the anode of zener diode 51 through resistor 48.

The cathode of zener diode 51 is connected to terminal 28 and ground.

The collector of transistor 47 is connected to the base of transistor 46.

The emitter of transistor 47 is connected to the anode of zener diode 51.

Capacitor 54 is connected between ground and the anode of diode 51. The cathode of diode 52 is connected to lead 37 through which it receives the bias voltage V3.

The anode of diode 52 is connected to the anode of diode 51 through resistor 53.

Node 55 which connects the base of transistor 46 to the collector of transistor 47 represents an input node for the regulation and control signals coming from the second and third blocks The switch block operates in a very simple way.

When transistor 13 (shown in FIG. 1) is on and current flows through windings 14 and 17, a current proportional voltage V26 is induced in winding 26 which voltage positively biases terminal 27, with respect to terminal 28.

This voltage, regardless of the voltage drop on diode 50, is applied to the emitter of transistor 46 and also to node 55, through resistor 49.

Due to the effect of the regulation and control signals applied to node 55, when voltage V26 is higher than the voltage present at node 55 which voltage is imposed by the regulation and control signals applied to node 55, the emitter-base junction in transistor 46 is directly biased and transistor 46 turns on.

The current at the collector of transistor 46 flows through resistor 48 and directly biases the base-emitter junction of transistor 47 which turns on too.

All this has the regenerative effect of decreasing the voltage present at node 55 so that transistors 46, 47 remain on at least up to the moment when voltage $V_{26}$ drops to approximately 1.1 V (that is, direct voltage drop on diodes 50 and 51 plus VBE of transistor 47 and VCESAT of transistor 46).

In practice, when an increasing current flows through winding 17, an electromotive force is generated in winding 29 that applies a negative voltage V3 to lead 37.

This negative voltage induces, through diodes 52 and 53, a charge current of capacitor 54 that is negatively charged up to a minimum value limited by the diode 51 zener voltage.

Due to the effect of the negative voltage on capacitor 54 transistors 46 and 47 remain on even when TR 13 is already off and they allow a magnetizing current followed by a demagnetizing current to flow through winding 26 up to the moment when the current that crosses transistor 46 and transistor 47 reaches values that are below the limit required for circuitry to remain on.

The second block of circuit 40 carries out the function of supplying circuit 40 with an auxiliary supply voltage VS.

It also provides the power supply with a protection against short circuits and further provides for a soft start.

The second block consists of diodes 56, 66, zener diodes 58, 67, transistors 65, 69, 81 and resistors 57, 60, 62, 64, 68. The anode of diode 56 is connected to wire 43 (FIG. 1).

The cathode of diode 56 is connected to node 70 through resistor 57. The cathode of zener diode 58 is connected to node 70 and the anode is grounded.

Capacitor 59 is connected between node 70 and ground.

The function of these components is to generate a stabilized auxiliary supply voltage VS equal to the zener voltage of diode 58 present at node 70.

Resistor 60 and capacitor 63 are connected in series between wire 43 and ground.

Node 71, which is common to resistor 60 and capacitor 63, is connected to the cathode of diode 61 whose anode is connected to node 55.

Resistor 60 and capacitor 63 form an RC network whose function is to limit the voltage present at diode 61 to a variable value which increases during the start-up phase.

Prior to the power supply being powered-on, capacitor 63 is discharged and it then slowly charges itself as the power supply is turned on.

Initially the current flowing through transformers T1 and T2 is limited by the low charge levels of capacitor 63 and voltages V1 and V2 present at the power supply outputs increase slowly until they reach the regulation range where the voltage present at node 55 is limited by the regulation block and is lower than the charge voltage of capacitor 63.

In these conditions diode 61 is reverse biased.

Therefore the function carried out by the RC network 60, 63 is that of imposing a soft start to the power supply.

FIG. 5 shows the timing diagram of current $I_C$ flowing in windings 14 and 17 in subsequent periods starting from power on.

Returning to FIG. 4 resistor 62, which is connected in parallel to capacitor 63, ensures that capacitor 63 discharges itself when the power supply is switched off.

The block described above also has the function of protecting the power supply against short circuits that might occur.

To this end the collectors of the two NPN type transistors 65 and 69 are connected to node 71 through resistor 64.

The emitters are grounded.

The base of transistor 65 is connected to lead 42 through which is supplied with voltage V4.

When the current SUNK at output 44 of the power supply (FIG. 4) exceeds a predefined value which is indicative of a short circuit or anyhow, of an overload, the voltage drop in resistor 39; that is, voltage V4 is higher than the direct bias voltage (0.7 V) of the emitter-base function of transistor 65.

Thus transistor 65 turns on and rapidly discharges capacitor 63 thus zeroing the voltage present at node 55.

As a result current $I_C$ is maintained to very low levels.

If the overload decreases, transistor 65 turns off and the power supply goes "softly" back to the regulation condition.

Transistor 69 carries out a function similar to that of transistor 65.

However it limits the primary current and, therefore, the global power supply load.

To this end the base of transistor 69 is connected to the anode of zener diode 67.

The cathode of diode 67 is connected to the cathode of diode 66 whose anode is connected to the cathode of diode 50.

The emitter of the PNP type transistor 81 is connected to node 71, the collector is connected to the base of transistor 69 and the base connected to the collector of transistor 69.

A resistor 68 having a suitable value connects the base of transistor 69 to ground. When voltage V26 present at terminal 27 exceeds the voltage drops on diodes 50, 66, 67, which is a condition representative of an overload for current $I_C$, the base-emitter junction of transistor 69 is forward biased and transistor 69 turns on. The voltage drop across resistor 64 forward biases the emitter base junction of transistor 81 which, with a regenerative effect, maintains transistor 69 turned on, even if the voltage drops, thus causing capacitor 63 to discharge itself. The third block of circuit 40 carries out the function of controlling current $I_C$ so as to regulate voltage V1 at the power supply output 34.

The third block comprises an operational amplifier 72, a diode 73, a zener diode 78, a capacitor 74 and resistors 75, 76, 77, 79. The operational amplifier 72 is fed by the auxiliary voltage VS present at node 70.

A reference voltage VR generated by the auxiliary voltage VS by means of resistor 79 and zener diode 78 is applied to the non inverting input of amplifier 72 through resistor 76.

Voltage V1, to be regulated, is applied to the inverting input of amplifier 72 through resistor 77.

The output of amplifier 72 is connected to the inverting input by a feed-back network whose function is to define the amplifier and the frequency response so as to ensure its stability.

This network, in its simplest form consists of a resistor 75 in parallel with capacitor 74 and connected between the inverting input and the output.

The output is connected to the cathode of diode 73 whose anode is connected to node 55.

FIG. 6 shows the static characteristics of the regulation block: when voltage V1 equals reference voltage $V_R$ the output voltage Vo also equals the reference voltage.

When V1 is lower than VR the output voltage Vo increases linearly while when V1 is higher than VR it decreases linearly.

The slope of the static curve is defined by the gain of the regulation block.

The mode in which the regulation block operates is widely known. FIG. 7 shows the relationship between voltage V26 and regulation voltage Vo for a fly-back type power supply.

At the beginning of a conduction phase; that is, at instant To, the current flowing through windings 16 and 17 increases linearly with a constant slope defined by the inductance winding 17 with the secondary windings 30 and 29 of transformer T2 kept open.

In fact, in the case of the fly-back type power supply the secondary windings do not generate any current on the load during the magnetizing phase of the transformer.

Therefore voltage V26 increases linearly until it reaches value Vo. At this point the switching block short-circuits winding 26 to a voltage having a reverse polarity, current $I_C$ is interrupted and voltage V26 drops to a negative value. Therefore, within the power supply operational period, the value of voltage Vo defines a variable ratio between the conduction/non conduction time of transistor 13 and therefore the magnetizing energy stored in transformer T2. When current $I_C$ is interrupted, the energy stored in transformer T2 is transmitted to the buffer capacitors connected to the secondary windings and it charges them.

The energy is then transmitted from the secondary windings to the loads.

It is clear that the level and charge voltage of such capacitors as 32 and 35 depend on the energy they receive during each period, with respect to the energy transmitted to the load. The error of voltage V1, with respect to voltage VR, provides for a regulation signal that, within the transformer operational period, modifies the time during which it is on, thus changing the transferred energy.

As a result, the error is reduced and voltage VI is brought back to values that are very close to VR.

The feed-forward type power supplies perform in a similar way to the fly-back type power supplies, the only difference being that, in this case, as shown in FIG. 8, the transfer of energy from the primary winding to the secondary winding of transformer T2 occurs during the magnetizing phase of the transformer and will continue during the demagnetizing phase.

Current $I_C$, and therefore voltage V26 can take up a value, since the beginning, which is different from zero and depends on the intensity of the magnetizing currents that are flowing through the secondary windings 29 and 30 and that then increases linearly until the value of the regulating voltage Vo is reached.

It is clear that the circuitry embodiment shown in FIGS. 1 and 4 is only a preferred embodiment of the invention and that changes can be made without departing from the scope of the invention. For example the actuation circuit that is directly fed by the input DC voltage and that comprises transistor 84 and related driving circuit, may be replaced with an integrated oscillator circuit.

For example, the integrated circuit available from SILICON GENERAL under code SG524 includes an oscillator whose work frequency is determined by a capacitor and a resistance both externally connected. It also supplies in output short voltage pulses at the oscillator frequency, which can be applied to winding 28 in order to operate transistor 13.

Clearly, in this case, the advantage of using the energy stored in capacitor 21 to operate transistor 13 is lost.

It is also clear that transistor 13, which in FIG. 1 is of the NPN type, can also be of the PNP type, and windings 14 and 17 can be placed upstream of the collector of transformer 13 instead of downstream the emitter of transformer 13; or else one winding upstream and the other winding downstream the collector.

Likewise, the order of the arrangement in series of the two windings can be reversed. The auxiliary voltage VS that feeds the regulating circuits shown in FIG. 4 can be obtained from winding 29 instead of winding 30 and the switching circuits which comprise transistors 46 and 47 can be replaced with circuitry which is functionally equivalent.

I claim:

1. A switching mode power supply having a power transformer with a primary power winding and a secondary power winding and current flowing in said primary power winding induces a voltage in said secondary power winding, having a DC voltage source, and having a driving transistor with base, collector and emitter terminals, said transistor emitter being connected in series with said primary winding, the output of said secondary power winding being connected to a rectifier and output filter, and said driving transistor is cyclically turned on and off to cyclically connect said DC voltage source to said primary power winding, and there is a regulated voltage at the output of said output filter, characterized in that said power supply comprises:

a control transformer having an activation winding, a primary control winding, a secondary regeneration winding, a metering and deactivation winding, said primary control winding being series connected to said primary power winding, a resistor series connected between the base of said transistor and one terminal of said regeneration winding, the emitter of said transistor being connected to the other terminal of said regeneration winding, and voltages are induced in said regeneration winding to turn said transistor on and off, first circuit means powered by said DC voltage source for generating a sequence of first voltage pulses having a preestablished frequency, said first pulses being applied to said activation winding, to induce in said regeneration winding corresponding voltage pulses which turn-on said transistor and cause current to flow through said transistor and the serial connected primary power winding, said transistor being kept on by a voltage induced in said regeneration winding responsive to said current flowing in said primary control winding, and second circuit means powered by the voltage induced in said secondary power winding, said second circuit means having an output connected to said metering and deactivating winding and applying to said metering winding a second voltage pulse opposed to a voltage induced in said metering winding by the current flowing in said primary control winding, and when the voltage induced in said metering winding exceeds a threshold value, said second voltage pulse induces a reverse biasing voltage in said regenerating winding for switching off said transistor.

2. A switching mode power supply as claimed in claim 1 where said first circuit means comprises a capacitor charged by said voltage source through a resistor and control means, and discharging said capacitor on said activation winding, when the charging voltage of said capacitor equals a preestablished value.

3. A switching mode power supply as claimed in claim 1 where said second circuit means comprises a second capacitor charged through a second resistor by said regulated voltage, the voltage to which said second capacitor charges being variable and providing said threshold value above which said transistor is switched off and second control means for shorting said second capacitor when the voltage induced in said metering winding exceeds a preestablished value.

* * * * *